US009367507B2

United States Patent
Yang

(10) Patent No.: US 9,367,507 B2
(45) Date of Patent: Jun. 14, 2016

(54) EXPANSION CARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 417 days.

(21) Appl. No.: 14/059,984

(22) Filed: Oct. 22, 2013

(65) Prior Publication Data

US 2015/0046621 A1 Feb. 12, 2015

(30) Foreign Application Priority Data

Aug. 8, 2013 (CN) .......................... 2013 1 0343277

(51) Int. Cl.
*G06F 13/00* (2006.01)
*G06F 13/40* (2006.01)
*G06F 12/00* (2006.01)

(52) U.S. Cl.
CPC ................................. *G06F 13/4068* (2013.01)

(58) Field of Classification Search
CPC ................... G06F 13/00; G06F 12/00
USPC ................... 710/301–302, 305–315; 711/100
See application file for complete search history.

(56) References Cited

U.S. PATENT DOCUMENTS

| 3,711,676 | A * | 1/1973 | Witzel | B23H 1/10 |
| | | | | 204/225 |
| 6,295,565 | B1 * | 9/2001 | Lee | G06F 1/15 |
| | | | | 710/2 |
| 8,069,293 | B1 * | 11/2011 | Rogan | G06F 13/385 |
| | | | | 370/248 |
| 2003/0188067 | A1 * | 10/2003 | Okin | G05B 19/0423 |
| | | | | 710/301 |

(Continued)

*Primary Examiner* — Christopher Shin
(74) *Attorney, Agent, or Firm* — Novak Druce Connolly Bove + Quigg LLP

(57) ABSTRACT

An expansion card includes a peripheral component interconnect express (PCIe) slot, a PCI expansion controller, a PCIe/serial advanced technology attachment (PCIe/SATA) converter, a hard disk drive (HDD) controller, and a storage chip. An edge connector is arranged on a bottom side of the expansion card and includes power pins, ground pins, and signal pins. The power pins are connected to power pins of the PCIe slot, the PCIe expansion controller, the PCIe/SATA converter, the HDD controller, and the storage chip. The signal pins are connected to the PCIe expansion controller. The PCIe expansion controller expands a PCI signal into PCI signals and provides the PCI signals to the PCIe slot and the PCIe/SATA converter. The PCIe/SATA converter converts the PCI signal to SATA signals and provides the SATA signals to the HDD controller. The HDD controller controls the storage chip to read or write data.

4 Claims, 2 Drawing Sheets

(56) References Cited

U.S. PATENT DOCUMENTS

| | | | |
|---|---|---|---|
| 2005/0038986 A1* | 2/2005 | Agan | G06F 9/4411 713/2 |
| 2005/0144349 A1* | 6/2005 | Vogt | G06F 13/4068 710/301 |
| 2006/0184704 A1* | 8/2006 | Yu | G06F 13/409 710/300 |
| 2006/0294278 A1* | 12/2006 | Lin | G06F 13/409 710/300 |
| 2010/0199011 A1* | 8/2010 | Chen | G06F 13/4063 710/301 |
| 2010/0296236 A1* | 11/2010 | Schuette | G06F 1/187 361/679.31 |
| 2012/0033370 A1* | 2/2012 | Reinke | G06F 1/185 361/679.4 |
| 2013/0073768 A1* | 3/2013 | Cong | G06F 13/409 710/301 |
| 2013/0107444 A1* | 5/2013 | Schnell | H05K 7/1498 361/679.33 |
| 2014/0177195 A1* | 6/2014 | Yang | G06F 13/4045 361/784 |
| 2014/0211406 A1* | 7/2014 | Liu | G06F 1/185 361/679.32 |
| 2015/0019784 A1* | 1/2015 | He | G06F 13/409 710/301 |
| 2015/0019918 A1* | 1/2015 | Li | G06F 11/1092 714/54 |
| 2015/0064939 A1* | 3/2015 | Rabinovitz | H01R 12/721 439/65 |
| 2015/0245100 A1* | 8/2015 | Stallings | H04N 21/4331 725/58 |

* cited by examiner

EXPANSION CARD

BACKGROUND

1. Technical Field

The present disclosure relates to an expansion card.

2. Description of Related Art

Adapter cards are widely used in server systems, to provide a number of expansion slots for receiving function cards when the number of the expansion slots of the server system is limited, and also provide a conversion function when the height of the function card inserted into the expansion slot does not satisfy a requirement of the server system. However, the function of most adapter card is singular and some space of the adapter card is wasted. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one."

Figure 1:
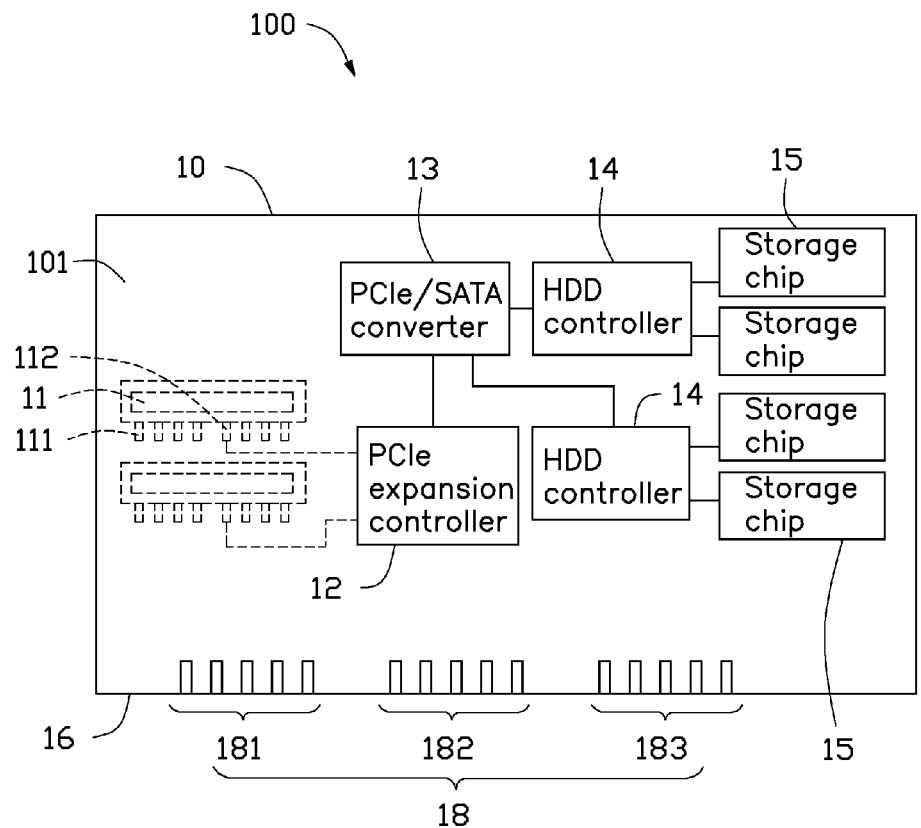
FIG. 1 is a schematic view of an expansion card in accordance with an embodiment of the present disclosure.
Figure 2:
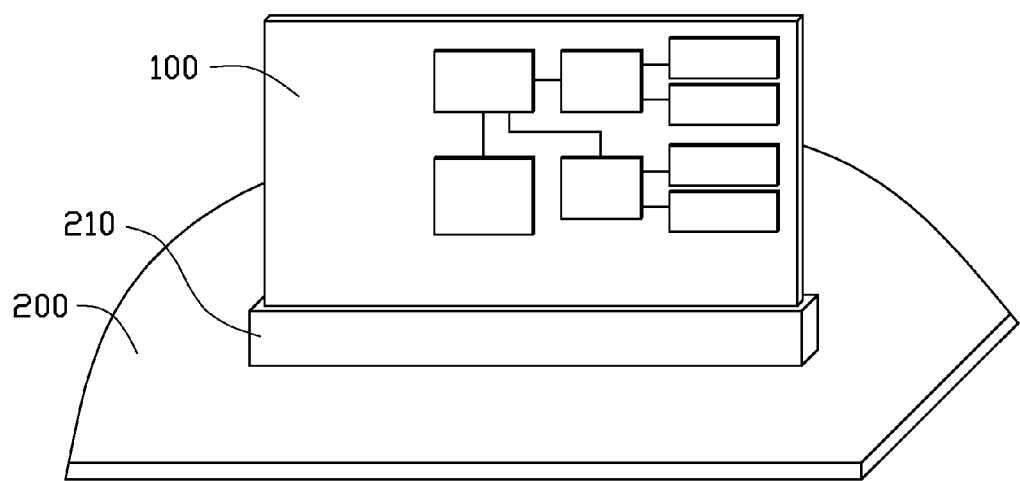
FIG. 2 is an assembled, isometric view of the expansion card of FIG. 1 connected to a motherboard.

FIGS. 1 and 2 show an expansion card 100 in accordance with an embodiment. The expansion card 100 includes a substantially rectangular circuit board 10. A plurality of peripheral component interconnect express (PCIe) slots 11 (in one embodiment, there are two PCIe slots 11), a PCIe expansion controller 12, a PCIe to serial advanced technology attachment (PCIe/SATA) converter 13, a plurality of hard disk drive (HDD) controllers 14 (in one embodiment, there are two HDD controllers 14), and a plurality of storage chips 15 (in one embodiment, there are four storage chips 15) are all arranged on the circuit board 10. The PCIe expansion controller 12, the PCIe/SATA converter 13, the HDD controllers 14, and the storage chips 15 are all arranged on a first sidewall of the circuit board 10. The PCIe slots 11 are arranged on a second sidewall opposite to the first sidewall of the circuit board 10.

An edge connector 18 is arranged on a bottom side 16 of the circuit board 10, to be inserted into a PCIe slot 210 of a motherboard 200. The edge connector 18 includes a plurality of power pins 181, a plurality of ground pins 182, and a plurality of signal pins 183. The power pins 181 are connected to power pins 111 of each of the PCIe slots 11, the PCIe expansion controller 12, the PCIe/SATA converter 13, the HDD controllers 14, and the storage chips 15, to provide voltages to the PCIe slots 11, the PCIe expansion controller 12, the PCIe/SATA converter 13, the HDD controllers 14, and the storage chips 15. The ground pins 182 are connected to a ground layer (not shown) of the circuit board 10. The signal pins 183 are connected to an input terminal of the PCIe expansion controller 12. An output terminal of the PCIe expansion controller 12 is connected to signal pins 112 of each PCIe slot 11 and an input terminal of the PCIe/SATA converter 13. An output terminal of the PCIe/SATA converter 13 is connected to an input terminal of each HDD controller 14. Each HDD controller 14 is connected to two storage chips 15, to control the storage chips 15 to read or write data. In one embodiment, the edge connector 18 accords with PCIe X8 standard. The PCIe slots 11 are PCIe X8 slots.

In use, the edge connector 18 is inserted into the PCIe slot 210 of the motherboard 200. A function card is inserted into a corresponding PCIe slot 11. When the motherboard 200 receives power, a voltage to the PCIe slots 11 is outputted by the motherboard 200 to the PCIe expansion controller 12, the PCIe/SATA converter 13, the HDD controllers 14, and the storage chips 15 through the PCIe slot 210 and the power pins 181. At the same time, the motherboard 200 outputs a PCI signal to the PCIe expansion controller 12 through the PCIe slot 210 and the signal pins 183. The PCIe expansion controller 12 expands the received PCI signal into a plurality of PCI signals and provides the PCI signals to the function cards which are inserted into the PCIe slots 11, and the PCIe/SATA converter 13. The function card can communicate with the motherboard 200 according to the received PCI signals. The PCIe/SATA converter 13 converts the received PCI signal to a plurality of SATA signals and provides the SATA signals to the HDD controllers 14. Each HDD controller 14 controls the corresponding storage chips 15 to read or write data according to the received SATA signal from the corresponding HDD controllers 14.

The motherboard 200 outputs a voltage to the expansion card 100 through the power pins 181 of the edge connector 18. The motherboard 200 also outputs a PCI signal to the PCIe slots 11 through the signal pins 183 and the PCIe expansion controller 12, and the PCIe expansion controller 12 outputs the PCI signal to the HDD controllers 14 through the PCIe/SATA converter 13, to signal the function card to communicate with the motherboard 200. The HDD controller 14 controls the storage chips 15 to read or write data. The function of the expansion card 100 can be expanded through using the space of the circuit board 10 which can accommodate the function cards.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An expansion card comprising:
   a circuit board;
   a plurality of peripheral component interconnect express (PCIe) slots arranged on the circuit board;
   a PCI expansion controller arranged on the circuit board and connected to signal pins of each of the plurality of PCIe slots;
   a PCIe/serial advanced technology attachment (PCIe/SATA) converter arranged on the circuit board and connected to the PCIe expansion controller;
   a plurality of hard disk drive (HDD) controllers arranged on the circuit board and connected to the PCIe/SATA converter;

a plurality of storage chips arranged on the circuit board and connected to the corresponding HDD controllers; and an edge connector arranged on a bottom side of the circuit board, to be inserted into a PCIe slot of a motherboard, wherein the edge connector comprises a plurality of power pins, a plurality of ground pins, and a plurality of signal pins, the plurality of power pins is connected to power pins of each of the plurality of PCIe slots, the PCIe expansion controller, the PCIe/SATA converter, the plurality of HDD controllers, and the plurality of storage chips, to provide voltages received from the motherboard to the plurality of PCIe slots, the PCIe expansion controller, the PCIe/SATA converter, the plurality of HDD controllers, and the plurality of storage chips; the plurality of ground pins is grounded; the plurality of signal pins is connected to the PCIe expansion controller, the PCIe expansion controller expands a PCI signal received from the motherboard into a plurality of PCI signals and provides the plurality of PCI signals to the plurality of PCIe slots and the PCIe/SATA converter, the PCIe/SATA converter converts the received PCI signal to a plurality of SATA signals and provides the plurality of SATA signals to the plurality of HDD controllers, each of the plurality of HDD controllers controls the corresponding storage chips to read or write data according to the received SATA signal.

2. The expansion card of claim 1, wherein the plurality of PCIe slots comprises two PCIe slots, the plurality of HDD controllers comprises two HDD controllers, the plurality of storage chips comprises four storage chips, each of the plurality of HDD controllers is connected to two storage chips.

3. The expansion card of claim 1, wherein the PCIe expansion controller, the PCIe/SATA converter, the plurality of HDD controllers, and the plurality of storage chips are all arranged on a first sidewall of the circuit board, and the plurality of PCIe slots is arranged on a second sidewall of the circuit board opposite to the first sidewall.

4. The expansion card of claim 1, wherein the edge connector accords with PCIe X8 standard, the plurality of PCIe slots is a plurality of PCIe X8 slots.

* * * * *